though marked as United States Patent [19]

Aritomi

[11] 4,147,675
[45] Apr. 3, 1979

[54] OIL-MODIFIED ALKYD RESIN COMPOSITIONS

[75] Inventor: Mitsutoshi Aritomi, Ibaraki, Japan

[73] Assignee: Mitsubishi Petrochemical Company Limited, Japan

[21] Appl. No.: 854,232

[22] Filed: Nov. 23, 1977

[30] Foreign Application Priority Data

Nov. 29, 1976 [JP] Japan ................. 51-143182

[51] Int. Cl.$^2$ .................... C09D 3/64; C09D 3/68
[52] U.S. Cl. .................. 260/22 CB; 260/23 P
[58] Field of Search ............. 260/22 A, 22 CB, 23 P

[56] References Cited

U.S. PATENT DOCUMENTS

| | | | |
|---|---|---|---|
| 1,950,468 | 3/1934 | Zwilgmeyer | 260/22 A |
| 2,381,884 | 8/1945 | Rothrock | 260/22 A |
| 2,628,209 | 2/1953 | Fisk | 260/22 A |
| 3,380,942 | 4/1968 | Menke | 260/22 T |
| 3,390,205 | 6/1968 | Schnell et al. | 260/22 A |
| 3,894,978 | 7/1975 | Montesissa et al. | 260/22 CB |

Primary Examiner—Ronald W. Griffin
Attorney, Agent, or Firm—Robert E. Burns; Emmanuel J. Lobato; Bruce L. Adams

[57] ABSTRACT

A paint composition comprises (A) 30 to 70 percent by weight of an oil-modified alkyd resin of an oil length of 30 to 70 percent which has been modified with sorbic acid, crotonic acid, or 2-($\beta$-furyl) acrylic acid, the content of which is 0.5 to 30 percent by weight and (B) 70 to 30 percent by weight of a polymerizable monomer in which the oil-modified alkyd resin is dissolved.

9 Claims, No Drawings

OIL-MODIFIED ALKYD RESIN COMPOSITIONS

BACKGROUND OF THE INVENTION

This invention relates generally to hardening resin compositions of solventless type. More specifically, the invention relates to oil-modified alkyd resin compositions which can be applied as coatings to form coating films of excellent hardness, resistance to bending, resistance to impacts, property of being applicable as thick layers (thereinafter referred to as thickly applicable property), and resistance to water. The term "paint" is herein used to designate collectively coating materials such as paints, varnishes, enamels, coating compounds, and the like.

Still more specifically, the invention relates to improvements in the water resistance and hardness of the paint ingredients in the ingredient system of my prior invention disclosed in my previous Japanese Patent Application No. 44317/1976

In general, oil-modified alkyd resins are prepared from polybasic acids, polyhydric alcohols, and saturated or unsaturated fatty acids or oils. These oil-modified alkyd resins are being used for various paints such as paints for drying at room temperature, the characteristic of these resins to harden as a result of participation of the double bond of the unsaturated fatty acid in the composition in a bridging or cross-linking reaction because of the oxygen in air being utilized.

Under the assumption that the fatty acid or oil in the resin in an oil-modified alkyd resin has reacted with glycerine to form a triglyceride, the weight percentage of the triglyceride in the resin is called the oil length. This oil length is closely related to the physical properties such as solubility, hardness, luster or gloss, color retentivitiy, weather resistance, hardening time, and preservability of the paint. For example, while an increase in the oil length results in an increase in the flexibility of the paint film and its solubility in organic solvents, it tends to decrease the hardness of the paint film. On the other hand, a decrease in the oil length is useful in improving the luster and color retentivity of the paint film but tends to decrease the spreadability of the paint. Of course, the oil length is not the only factor influencing the above mentioned physical properties of the paint, these properties being influenced also by the properties of the other ingredients of the oil-modified alkyd resin.

Heretofore, oil-modified alkyd resins of oil lengths of the order of 30 to 80 percent have been generally dissolved in solvents such as turpentine oil and toluene and used in room temperature drying paints and baking paints. However, oil-modified alkyd resin paints diluted by such solvents are accompanied by problems such as long drying times and pollution of the working environment by the evaporation of the solvents at the time of drying.

Oil-modified alkyd resin paints in which solvents are not used, that is, paints of the solventless type (which may be called pollutionless type) in which all paint ingredients react, are now being studied. However, those that have been developed to date have been accompanied by problems such as poor adhesion to metals, inadequate mechanical properties such as impact resistance and bending resistance, and inadequate coating property and have not been reduced to practical use, as far as I am aware.

In order to solve these problems, I have previously proposed oil-modified alkyd resins comprising the following ingredients as disclosed in the patent applications cited hereinbefore.

1. An oil-modified alkyd resin composition comprising:
   (A) 50 to 80% by weight of an oil-modified alkyd resin which is modified with a fatty acid containing at least 65% by weight of linoleic acid and/or linolenic acid and has an oil length of 40 to 70%; and
   (B) 50 to 20% by weight of an acrylate and/or methacrylate which is a monoester of an alcohol having from 2 to 20 carbon atoms and acrylic acid or methacrylic acid.

This paint composition has the advantages of excellent adhesion to metals and short hardening time, thereby possessing great practicability. However, it requires approximately one day to produce a water resistant film therefrom. For this reason, there has been a great demand for improvement of these compositions for obtaining water resistant films in a short time particularly in the fields of structures exposed to the atmosphere such as bridges, production plants, and ships.

SUMMARY OF THE INVENTION

It is an object of this invention to solve the above described problems by providing a composition formed by dissolving an oil-modified alkyd resin, which has been modified with an $\alpha,\beta$-unsaturated monocarboxylic acid, in a polymerizable monomer.

According to this invention, briefly summarized, there are provided oil-modified alkyd resin compositions each comprising: from 30 to 70 percent by weight of an ingredient (A) comprising an oil-modified alkyd resin of an oil length of from 30 to 70 percent which has been modified with an $\alpha,\beta$-unsaturated monocarboxylic acid selected from the group consisting of sorbic acid, crotonic acid, and 2-($\beta$-furyl) acrylic acid, the content of the $\alpha,\beta$-unsaturated monocarboxylic acid being from 0.5 to 30 percent by weight; and from 70 to 30 percent by weight of an ingredient (B) comprising a polymerizable monomer in which the ingredient (A) is dissolved.

I have found that the oil-modified alkyd resin compositions of solventless type can be dried at room temperature of hardened by baking to have excellent properties such as surface smoothness, hardness, adhesiveness, bending resistance, impact resistance, thickly applicable property, and water resistance as described in detail hereinafter.

The nature, utility, and further features of this invention will be apparent from the following detailed description beginning with a consideration of general aspects of the invention and concluding with specific examples of experiments in production illustrating preferred embodiments thereof.

DETAILED DESCRIPTION OF THE INVENTION

Ingredient (A): oil-modified alkyd resin modified with an unsaturated carboxylic acid The ingredient (A) as set forth above is substantially the same as oil-modified alkyd resins which are known heretofore or may be provided in the future except that it has been modified with a specific $\alpha,\beta$-unsaturated monocarboxylic acid. The method by which this modification with the $\alpha,\beta$-unsaturated monocarboxylic acid is carried out is also the same as the ordinary method of modifying an alkyd resin with a fatty acid.

Accordingly, examples of the polybasic acid of the alkyd resins are aromatic, aliphatic or alicyclic saturated or unsaturated polybasic acids such as phthalic anhydride, isophthalic acid, tetrahydrophthalic anhydride, adipic acid, sebacic acid, azelaic acid, branched 1,2,3,6-tetrahydrophthalic anhydride derivatives which are Diels-Adler adducts of an isoprene dimer having conjugated double bonds and maleic anhydride such as maleinated myrcene, maleinated alloocimene, maleinated ocimene, 3-($\beta$-methyl-2-butenyl)-5-methyl-1,2,3,6-tetrahydrophthalic acid or anhydride thereof, hexahydrophthalic anhydride, 4-methyl-tetrahydrophthalic anhydride, trimellitic acid, and mixtures of two or more of these acids.

Within limits wherein gelation will not occur, a part of given saturated polybasic acid such as the one mentioned above may be substituted by an unsaturated polybasic acid such as, for example, maleic acid, maleic anhydride, fumaric acid, and itaconic acid. Of these, a particularly preferable polybasic acid is a combination of phthalic acid and 3-($\beta$-methyl-2-butenyl)-5-methyl-1,2,3,6-tetrahydrophthalic anydride (hereinafter referred to by the abbreviation MBTHP). When MBTHP is used in a quantity of 2 to 100 mole percent, preferably 30 to 50 mole percent of the polybasic acid, it has a remarkable effect in lowering the viscosity of the alkyd resin.

Examples of polyhydric alcohols which can be used for the polyhydric alcohol ingredient are ethyleneglycol, diethyleneglycol, propyleneglycol, dipropyleneglycol, 1,4-butanediol, neopentylglycol, glycerine, pentaerythritol, trimethylol propane, trimethylolethane, tris(2-hydroxylethyl) isocyanurate, and mixtures of two or more of these alcohols. In general, dihydric-, trihydric- and tetrahydric alcohols of from 2 to 12 carbon atoms are usually preferable. Particularly preferable polyhydric alcohol is a combination of glycerine and pentaerythritol.

For the fat, oil, or fatty acid for forming the oil-modified alkyd resin, those which can be dried in air are used, examples being oils and fats such as linseed oil, soybean oil, tall oil, and safflower oil, dehydrated castor oil or fatty acids separated from these oils. Particularly desirable fatty acids are dehydrated castor oil fatty acid and safflower oil fatty acid contining more than 60 mole percent in the fatty acid moiety of linoleic acid and linolenic acid independently or as a mixture system.

According to this invention, the oil-modified alkyd resin comprising the above described three indispensable ingredients is further modified with an $\alpha,\beta$-unsaturated monocarboxylic acid. $\alpha,\beta$-unsaturated monocarboxylic acids which are suitable for use in this invention are crotonic acid, sorbic acid, and 2-($\beta$-furyl) acrylic acid, as mentioned hereinbefore, sorbic acid being particularly preferable. This $\alpha,\beta$-unsaturated carboxylic acid introduced into the oil-modified alkyd resin may be considered to react similarly as the fatty acid for oil modification and to be present as a side chain in the alkyd resin. Since this acid undergoes radical copolymerization with the ingredient (B) in the composition of this invention and thereby contributes to hardening of the formed film, it is highly effective particularly for improving the hardness and the water resistance of the formed paint film.

Of these four indispensable ingredients, the oil-modified alkyd resin is prepared by an ordinary process. Specific examples are the process wherein the $\alpha,\beta$-unsaturated monocarboxylic acid, the fatty acid, the polybasic acid, and the polyhydric alcohol are simultaneously charged into the reaction system and caused to react and the process in which the fatty acid, the polybasic acid, and the polyhydric alcohol are first caused to react, and then the $\alpha,\beta$-unsaturated monocarboxylic acid is caused to react with these reactants. The latter process is desirable on the point of preventing gelation during this preparation process.

These four indispensable ingredients can be supplied to the reaction in the form of their functional derivatives, for example, in the form of esters resembling fats and oils. In the case where an oil or fat is used, the polyhydric alcohol and ester only are ordinarily caused to react beforehand thereby to carry out ester exchange. Furthermore, whatever method is used, it is desirable that an agent for preventing gelation such as hydroquinone, for example, be added in order to prevent gelation during reaction.

An oil-modified alkyd resin suitable for use in this invention has an oil length of 30 to 70 percent, preferably 55 to 65 percent. I have found that if the oil length is less than 30 percent, it will give rise to a lowering of resistance such as water resistance of the formed paint film. On the other hand, if this oil length is higher than 70 percent, it gives rise to undesirable results such as a lowering the hardness of the formed film at the initial stage of drying and a deterioration of the surface smoothness. As mentioned hereinbefore, the oil length of this invention is the percentage by weight of the monobasic acid triglyceride the monobasic acid of which has originated from the fat or oil or the fatty acid separated therefrom in the oil-modified alkyd resin after its modification with the $\alpha,\beta$-unsaturated monocarboxylic acid.

The content of the $\alpha,\beta$-unsaturated monocarboxylic acid in the oil-modified alkyd resin which has been modified with the $\alpha,\beta$-unsaturated monocarboxylic acid is 0.5 to 30 percent by weight, preferably 2 to 15 percent by weight. I have found that if this content is less than 0.5 percent, there will be no appreciable effect in improving the water resistance and hardness of the formed paint film. On the other hand, if this content exceeds 30 percent, gelation will very readily occur during the alkyd preparation, which will thereby become difficult.

The acid value of the oil-modified alkyd resin modified with the $\alpha,\beta$-unsaturated monocarboxylic acid which is used in this invention is ordinarily of the order of 5 to 40, and the number of hydroxyl groups is ordinarily from 20 to 150.

Ingredient (B): polymerizable monomer

For this monomer, it is possible to use any monomer which is capable of undergoing radical polymerization, has at least one ethylenically unsaturated bond, and is capable of dissolving the above described ingredient (A) to a desired concentration as described in detail hereinafter. However, since it is an object of this invention to provide a resin composition which can be hardened at room temperature or hardened upon being heated, a polymerizable monomer of high boiling point of an order exceeding 200° C., for example, an acrylate or a methacrylate of a boiling point above 200° C. is especially preferable. A polymerizable monomer of such a high boiling point is advantageous on the point of odor.

Specific examples of polymerizable monomers suitable for use as the ingredient (B) in this invention are as set forth below. These monomers can be used in combinations thereof.

Mono(meth)acrylates of high boiling points:

Monoacrylates and monomethacrylates of monohydric or polyhydric alcohols having 2 to 20, preferably 2 to 18 carbon atoms, preferably monoacrylates and monomethacrylates of monohydric and dihydric alcohols. In each of these alcohols, the group to which the hydroxyl group is to be bonded is not necessarily a hydrocarbon, but the alcohol may be one having, for example, an ether linkage.

Specific examples of these monoacrylates and monomethacrylates are as set forth below. In the following list, the term "(meth)acrylate" means acrylate and methacrylate: 2-hydroxyethyl (meth)acrylate, 2-hydroxypropyl (meth)acrylate, 2-hydroxyethoxyethyl (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1- or -2-phenylethyl (meth)acrylate, polypropylene glycol mono(meth)acrylate, glycerine mono(meth)acrylate monohalfmaleate, diethyleneglycol mono(meth)acrylate, cyclohexyl (meth)acrylate, benzyl (meth)acrylate, 2-ethoxyethyl (meth)acrylate, 2-butoxyethyl (meth)acrylate, and tetrahydrofuryl (meth)acrylate.

(3) Di-tetra (meth)acrylate of high boiling points:

Examples are di-, tri-, and tetraesters of alcohols each having at least two hydroxyl groups and having 2 to 20 carbon atoms, preferably 2 to 6 carbon atoms, preferably dihydric, trihydric, and tetrahydric alcohols and acrylic acid and methacrylic acid. The alcohol is not necessarily one in which the group to which each hydroxyl group is to be bonded is a hydrocarbon but may be one which has ether bonds. Furthermore, in the case of a trihydric or higher polyhydric alcohol, it is suitable as long as its at least two hydroxyl groups have been esterified with acrylic acid or methacrylic acid.

Specific examples of these di-, tri-, and tetraacrylates and methacrylates are: ethyleneglycol di(meth)acrylate, diethyleneglycol di(meth)acrylate, 1,4-butanediol di(meth)acrylate, 1,6-hexanediol di(meth)acrylate, neopentylglycol di(meth)acrylate, trimethylolpropane tri(meth)acrylate, pentaerythritol tri(meth)acrylate, pentaerythritol tetra(meth)acrylate, and glycerine monoacrylate monomethacrylate.

Examples of particularly suitable polymerizable monomers for the ingredient (B) of this invention are: tetrahydrofuryl acrylate, 2-hydroxyethyl methacrylate, 2-hydroxypropyl acrylate, 3-butoxy-2-hydroxypropyl acrylate, 1,4-butanediol diacrylate, 1,6-hexanediol diacrylate, and trimethylolpropane tri(meth)acrylate.

Composition

Each oil-modified alkyd resin composition according to this invention contains the above described indispensable two ingredients (A) and (B) in a specific ratio.

The quantity of the ingredient (A) is from 30 to 70 percent by weight, preferably 40 to 60 pecent by weight, of the total weight of these two ingredients (A) and (B). If this quantity exceeds 70 percent, the resin composition will acquire a remarkably high viscosity, and its preparation and utilization, for example, as a paint, will become difficult. On the other hand if this quantity is less than 30 percent, the water resistance, impact resistance, and bending resistance of the formed paint film will deteriorate.

The quantity of the ingredient (B) is from 70 to 30 percent by weight, preferably 60 to 40 percent by weight, of the total weight of the two ingredients (A) and (B). A large quantity of the di-, tri-, or tetra(meth)acrylate in the ingredient (B) is desirable for obtaining a paint film of excellent water resistance and alkali resistance and high hardness. In this case, however, a tendency of the bending resistance and impact resistance of the paint film to decrease is observable. Accordingly, the content of the di-, tri-, or tetra(meth)acrylate is selected in accordance with the purpose of use.

Modifications

Various modifications or variations can be made in the oil-modified alkyd resin composition according to this invention provided that it comprises the above prescribed quantities of the two indispensable ingredients (A) and (B).

Accordingly, various additives can be added to the resin composition of this invention similarly as in the case of resin compositions in general. Examples of such additives are fillers, coloring agents, stabilizers, thixotropic agents, agents for improving the surface characteristics of the paint film, and pigment dispersants. These additives are appropriately added according to the use. Hardening agents and drying agents will be discussed hereinafter.

An important feature of the oil-modified alkyd resin composition according to this invention is that it is solventless, but this does not mean that it cannot be used by converting it into a solvent type. Accordingly, if so desired, this resin composition can be dissolved in a solvent such as toluene, xylene or mineral spirit and utilized in a solution state.

Utilization

The paint composition of this invention can be hardened by using a hardening agent, that is, a redox catalyst comprising an organic peroxide and a reducing agent and used, according to the necessity, in conjunction with a metal drying agent such as manganese naphthenate or cobalt naphthenate. Examples of hardening agents are:

(a) A combination of methylethylketone peroxide and cobalt naphthenate;

(b) A combination of a redox catalyst comprising benzoyl peroxide and dimethylaniline and cobalt naphthenate or manganese naphthenate; and (c) A combination of cyclohexanone peroxide and cobalt naphthenate.

Of these hardening agents, cobalt naphthenate is particularly suitable because it not only participates as a reducing agent in radical generation but functions also as a metal drying agent participating also in the oxidation hardening of the oil-modified alkyd resin.

The above described catalyst is used in proportions of 0.5 to 5 parts by weight of the organic peroxide and of 0.01 to 5 parts by weight of the reducing agent relative to 100 parts by weight of the paint composition.

Pigments such as titanium oxide, zinc white, ultramarine, and chromium oxide, agents for improving surface characteristics such as a stabilizing agent and polyethylene glycol, and a pigment dispersant may be added to the paint composition of this invention provided that they do not give rise to adverse results such as impairment of paint film properties and of the preservability of the paint.

The paint composition of this invention can be dried by drying and hardening at room temperature and also by baking and hardening by heating to a temperature above 100° C. Particularly when it is used as a room temperature drying paint, its hardening time is short, and, moreover, it is thickly applicable to thickness which is approximately 1.5 times that of an oil-modified alkyd resin paint of known solvent type (solvent, toluene 40 percent by weight). Therefore, the paint composition of this invention is highly suitable for use in painting structures exposed to outdoor air such as ships, production plants, steel frames of buildings, and bridges.

In order to indicate more fully the nature and utility of this invention, the following specific examples of experiments relating to production of resin compositions of the invention and comparison examples are set forth, it being understood that these examples are presented as illustrative only and that they are not intended to limit the scope of the invention.

Throughout the following examples of experiments and comparison examples, all quantities expressed in "parts" are parts by weight.

(1) PREPARATION OF ALKYD RESIN

PREPARATION EXAMPLE 1

A reaction vessel equipped with an agitator, a temperature gage, a cooler, a water separator, and a nitrogen introducing pipe was charged with 62.0 parts of dehydrated castor oil fatty acid, 12.6 parts of phthalic anhydride, 9.9 parts of MBTHP, 1.5 parts of glycerine, and 17.8 parts of pentaerythritol, and 0.1 part of hydroquinone and 4.0 parts of xylene where further added thereto. Reaction of these materials was then carried out in a stream of nitrogen gas at 220° C.

When the acid value of the formed alkyd became 40, 3.0 parts of sorbic acid and 0.2 part of hydroquinone were added to the reaction system, and the reaction was continued further until the acid value became 10, whereupon an oil-modified alkyd resin (herein referred to as resin A) of a sorbic acid constituent concentration of 3.0 percent and an oil length of 64.8 percent was obtained.

PREPARATION EXAMPLE 2

The reaction of Preparation Example 1 was carried out as described therein except for the use of 53.5 parts of dehydrated castor oil fatty acid, 14.9 parts of phthalic anhydride,, 11.8 parts of MBTHP, 5.9 parts of glycerine, 14.6 parts of pentaerythritol, and 6.5 parts of sorbic acid. As a result, an oil-modified alkyd resin (herein referred to as resin B) of a sorbic acid constituent concentration of 6.5 percent and an oil length of 55.9 percent was obtained.

PREPARATION EXAMPLE 3

The reaction of Preparation Example 1 was carried out as described therein except for the use of 53.4 parts of dehydrated castor oil fatty acid, 13.5 parts of phthalic anhydride, 10.7 parts of MBTHP, 21.7 parts of pentaerythritol, and 10.7 parts of sorbic acid and except for the setting of the final acid value at 25. As a result, an oil-modified alkyd resin (herein referred to as resin C) of a sorbic acid constituent concentration of 10.7 percent and an oil length of 55.8 percent was obtained.

PREPARATION EXAMPLE 4

The reaction of Preparation Example 1 was carried out as set forth therein except for the use of 30.0 parts of dehydrated castor oil fatty acid, 22.1 parts of phthalic anhydride, 17.5 parts of MBTHP, 20.4 parts of glycerine, 3.3 parts of pentaerythritol, and 15.0 parts of sorbic acid and except for the setting of the final acid value at 35. As a result, an oil-modified alkyd resin (herein referred to as resin D) of a sorbic acid constituent concentration of 15.0 percent and an oil length of 31.4 percent was obtained.

PREPARATION EXAMPLE 5

The reaction of Preparation Example 1 was carried out as set forth therein except for the use of 55.6 parts of safflower oil fatty acid, 15.1 parts of phthalic anhydride, 11.9 parts of MBTHP, 7.3 parts of glycerine, 12.8 parts of pentaerythritol, and 4.4 parts of sorbic acid. As a result, an oil-modified alkyd resin (herein referred to as resin E) of a sorbic acid constituent concentration of 4.4 percent and an oil length of 58.1 percent was obtained.

PREPARATION EXAMPLE 6

The reaction of Preparation Example 1 was carried out as specified therein except for the use of 52.9 parts of soybean oil fatty acid, 14.9 parts of phthalic anhydride, 11.7 parts of MBTHP, 5.5 parts of glycerine, 15.1 parts of pentaerythritol, and 7.1 parts of sorbic acid. As a result, an oil-modified alkyd resin (herein referred to as resin F) of a sorbic acid constituent concentration of 7.1 percent and an oil length of 55.3 percent was obtained.

PREPARATION EXAMPLE 7

The reaction of Preparation Example 1 was carried out as specified therein except for the use of 65.0 parts of dehydrate castor oil fatty acid, 18.6 parts of phthalic anhydride, 20.0 parts of pentaerythritol, and 3.4 parts of sorbic acid. As a result, an oil-modified alkyd resin (herein referred to as resin G) of a sorbic acid constituent concentration of 3.4 percent and an oil length of 67.9 percent was obtained.

PREPARATION EXAMPLE 8

The reaction of Preparation Example 1 was carried out as set forth therein except for the use of 56.5 parts of dehydrated castor oil fatty acid, 15.0 parts of phthalic anhydride, 11.9 parts of MBTHP, 6.7 parts of glycerine, 13.5 parts of pentaerythritol, and 3.5 parts of crotonic acid. As a result, an oil-modified alkyd resin (herein referred to as resin H) of a crotonic acid constituent concentration of 3.5 percent and an oil length of 59.0 percent was obtained.

PREPARATION EXAMPLE 9

The reaction of Preparation Example 1 was carried out as set forth therein except for the use of 54.6 parts of dehydrated castor oil fatty acid, 15.1 parts of phthalic anhydride, 12.0 parts of MBTHP, 7.7 parts of glycerine, 12.1 parts of pentaerythritol, and 5.4 parts of 2-($\beta$-furyl) acrylic acid. As a result, an oil modified alkyd resin (herein referred to as resin I) of a 2-($\beta$-furyl) acrylic acid constituent concentration of 5.4 percent and an oil length of 57.1 percent was obtained.

PREPARATION EXAMPLE 10

A reaction vessel similar to that of Preparation Example 1 was charged with 60.0 parts of dehydrated castor oil fatty acid, 15.5 parts of phthalic anhydride, 12.2 parts of MBTHP, 10.1 parts of glycerine, and 8.9 parts of pentaerythritol, and 0.05 part of hydroquinone and 4 parts of xylene were further added thereto. The above enumerated materials were then caused to react in a stream of nitrogen gas at 220° C. until the acid value of the alkyd became 10. As a result, an oil-modified alkyd resin (herein referred to as resin J) of an oil length of 62.8 percent was obtained.

PREPARATION EXAMPLE 11

The reaction of Preparation Example 1 was carried out as set forth therein except for the necessary modification to produce an oil-modified alkyd resin (herein referred to as resin K).

(2) PRODUCTION OF RESIN COMPOSITION AND EVALUTION THEREOF AS PAINTS

The oil-modified alkyd resins prepared in the above described manner were respectively dissolved in the polymerizable monomers shown in the following Tables to the respectively indicated concentrations.

To 100 parts by weight of each of the solutions thus obtained, 1.0 part of cobalt naphthenate (cobalt content 6 percent), 0.2 part of manganese naphthenate (manganese content 4 percent), and 1.0 part of cyclohexanone peroxide were added. The paint thus obtained was applied so as to produce a dried film coating of a film thickness of 30 microns in Run I and Run III wherein the coating was air-dried or 40 microns in Run II wherein the coating was baked on a mild steel plate of 150-mm length, 50-mm width, and 0.3-mm thickness abraded with a No. 320 emery cloth, and was thereafter dried in an air bath at 30° C. in Run I and Run III or baked in an air bath at 100° C. for 5 minutes in Run II. The physical properties of the paint films thus obtained were measured under the conditions set forth below. Whereupon the results shown in Table were obtained.

MEASURING METHODS

Viscosity: EMILA rotating viscometer (manufactured by Reciprotor Company, Denmark).
Set to touch time: in accordance with Japanese Industrial Standards, JIS K-5400.
Pencil hardness: carried out by the procedure of JIS K-5652. Judged by the occurrence or nonoccurrence of scratches.
Bending resistance: in accordance with JIS K-5400 (2 mm.) (sample dried more than 7 days)
Impact resistance: Dupont impact strength (½ inch × 500 g. × 50 cm.) (sample dried more than 7 days).
Water resistance: observation of change due to 24 hours of immersion in water at room temperature. (O no change whatsoever; o slight loss of luster; x rusting)
Acid resistance: observation of change due to 5 hours of immersion in 5% aqueous solution of sulfuric acid at room temperature. (sampled dried more than 7 days) (O no change whatsoever)
Alkali resistance: observation of change due to 5 hours of immersion in 5% aqueous solution of sodium carbonate at room temperature. (sample dried more than 7 days) (O no change whatsoever; o slight loss of luster; x dissolved)

Table (No. 1)

| | Oil-modified alkyd resin | | | Unsaturated monocarboxylic acid | | Paint composition | | | | | | |
| | | | | | | | Polymerizable monomer (%) | | | | | Viscocity at 25° C (poise) |
| Run*1 | Resin | Fatty acid, indicated by oil name | Oil length (%) | Name | Constituent concentration in alkyd (%) | Alkyd resin (%) | HPA | BDDA | TMPA | ST | MMA | |
| --- | --- | --- | --- | --- | --- | --- | --- | --- | --- | --- | --- | --- |
| I-1 | A | Dehydrated castor oil | 64.8 | Sorbic acid | 3.0 | 55 | 10 | 35 | — | — | — | 1.7 |
| I-2 | B | " | 55.9 | " | 6.5 | 50 | 20 | 30 | — | — | — | 3.1 |
| I-3 | C | " | 55.8 | " | 10.7 | " | " | " | — | — | — | 4.5 |
| I-4 | D | " | 31.4 | " | 15.0 | 33.4 | 33.3 | 33.3 | — | — | — | 4.6 |
| I-5 | E | Safflower oil | 58.1 | " | 4.4 | 55 | 10 | 35 | — | — | — | 1.6 |
| I-6 | F | Soybean oil | 62.7 | " | 5.0 | " | " | " | — | — | — | 1.9 |
| I-7 | G | Dehydrated castor oil | 67.9 | " | 3.4 | 50 | 20 | 30 | — | — | — | 4.0 |
| I-8 | H | " | 59.0 | Crotonic acid | 3.5 | 55 | 10 | 35 | — | — | — | 2.3 |
| I-9 | C | " | 55.8 | Sorbic acid | 10.7 | 50 | 10 | 30 | 10 | — | — | 5.0 |
| I-10 | I | " | 57.1 | 2-(β-furyl)acrylic acid | 5.4 | 55 | 10 | 35 | — | — | — | 2.5 |
| I-11** | C | " | 55.8 | Sorbic acid | 10.7 | 60 | — | 10 | — | 30 | — | 3.0 |
| I-12 | K | " | 58.1 | " | 4.4 | 55 | 15 | 30 | — | — | — | 3.5 |
| I-13** | K | " | " | " | " | 60 | — | — | 10 | — | 30 | 1.8 |

HPA : 2-hydroxypropylacrylte, BDDA: 1, 4-butandioldiacrylate,
TMPA : trimethylrolpropanetriacrylate, ST : styrene, MMA : methyl methacrylate
*1 Run I : Present invention, air-dried.
**Runs I-11 and I-13 are reference runs wherein ingredient B is a low boiling monomer, viz styrene or methyl methacrylate.

Table (No. 2)

| | | Pencil hardness | | | Water resistance | | | | | | | |
| | Surface smoothness | Dried 1 day | Dried 3 days | Dried 7 days | Dried 5 hrs | Dried 1 day immersed 1 day | 3 days | Bending resistance | Impact resistance | Acid resistance | Alkali resistance | Set to touch time |
| --- | --- | --- | --- | --- | --- | --- | --- | --- | --- | --- | --- | --- |
| Run*1 | | | | | | | | | | | | |
| I-1 | O | H-2H | 2H | 2H | O | O | O | O | O | O | O | 1.3 |

Table (No. 2)-continued

| Run*1 | Surface smooth-ness | Pencil hardness | | | Water resistance | | | Bending resis-tance | Impact resis-tance | Acid resis-tance | Alkali resis-tance | Set to touch time |
|---|---|---|---|---|---|---|---|---|---|---|---|---|
| | | Dried 1 day | Dried 3 days | Dried 7 days | Dried 5 hrs | Dried 1 day immersed 1 day | 3 days | | | | | |
| I-2 | O | H-2H | 2H | 2H | O | O | O | O | O | O | O | 0.7 |
| I-3 | O | 2H | 2H | 2H-3H | O | O | O | O | O | O | O | 3.0 |
| I-4 | O | H | 2H | 2H-3H | O | O | O | O | O | O | O | 1.3 |
| I-5 | O | H | H-2H | H-2H | O | O | O | O | O | O | O | 2.5 |
| I-6 | O | H | H-2H | H-2H | O | O | O | O | O | O | O | 2.5 |
| I-7 | O | F-H | H-2H | H-2H | O | O | O | O | O | O | O | 1.5 |
| I-8 | O | H | H-2H | 2H | O | O | O | O | O | O | O | 2.5 |
| I-9 | O | 2H | 2H | 2H-3H | O | O | O | O | O | O | O | 2.0 |
| I-10 | O | H-2H | 2H | 2H | O | O | O | O | O | O | O | 1.5 |
| I-11 | O | 2H | 2H-3H | 2H-3H | O | O | O | O | O | O | O | 0.6 |
| I-12 | O | H-2H | 2H | 2H | O | O | O | O | O | O | O | 1.0 |
| I-13 | O | H-2H | 2H | 2H-3H | O | O | O | O | O | O | O | 0.5 |

*1 Run I: Present invention except for Runs I-11 and I-13 which are Reference examples, as set forth on page 22, air-dried Table (No. 3)

| Run*1 | Oil-modified alkyd resin | | | | | Paint composition | | | | | Vis-cocity at 25° C (poise) |
|---|---|---|---|---|---|---|---|---|---|---|---|
| | Resin | Fatty acid, indicated by oil name | Oil length (%) | Unsaturated monocarboxylic acid | | Alkyd resin (%) | Polymerizable monomer (%) | | | | |
| | | | | Name | Constituent concentration in alkyd (%) | | HPA | BDDA | TMPA | ST | MMA |
| II-1 | K | Dehydrated castor oil | 58.1 | Sorbic acid | 4.4 | 40 | — | — | 60 | — | — | 8.0 |
| II-2 | C | " | 55.8 | " | 10.7 | " | — | 20 | 40 | — | — | 5.0 |
| II-3 | D | " | 31.4 | " | 15.0 | " | — | — | 60 | — | — | 5.5 |
| III | J | Dehydrated castor oil | 62.8 | — | — | 55 | 10 | — | 35 | — | — | 1.6 |

HPA : 2-hydroxypropylacrylate, BDDA : 1,4-butanedioldiacrylate,
TMPA : trimethyrolpropanetriacrylate, ST : styrene, MMA : methyl methacrylate
*1 Run II : Present invention, baked. Run III : Reference Table (No. 4)

| Run*1 | Surface smooth-ness | Pencil hardness | | | Water resistance | | | Bending resis-tance | Impact resis-tance | Acid rsis-tance | Alkali resis-tance | Set to touch time |
|---|---|---|---|---|---|---|---|---|---|---|---|---|
| | | Dried 1 day | Dried 3 days | Dried 7 days | Dried 5 hrs | Dried 1 day immersed 1 day | 3 days | | | | | |
| II-1 | O | | 3H | O | O*2 | O*3 | O*4 | X | X | O | O | — |
| II-2 | O | | 3H | O | O | O | O | X | X | O | O | — |
| II-3 | O | | 3H | O | O | O | O | X | X | O | O | — |
| III | O | B | HB-F | H-2H | X | O | X | O | O | O | X | 1.2 |

*1 Run II : Present invention, baked. Run III : Reference
*2 after the baking.
*3 after the baking and immersion for 1 day.
*4 after baking and immersion for 3 days.

What I claim is:

1. An oil-modified alkyd resin composition comprising: from 30 to 70 percent by weight of an ingredient (A) comprising an oil-modified alkyd resin of an oil length of from 30 to 70 percent which is a poly condensation reaction product of:
   (a) a polybasic acid,
   (b) a polyhydric alcohol,
   (c) a saturated or unsaturated fatty acid or oil, and
   (d) an α,β-unsaturated monocarboxylic acid selected from the group consisting of sorbic acid, crotonic acid, and 2-(beta-furyl)acrylic acid, the content of the α,β-unsaturated monocarboxylic acid in the alkyd resin being 0.5 to 30 percent by weight; and from 70 to 30 percent by weight of an ingredient (B) comprising a polymerizable monomer having a boiling point higher than 200° C. in which the ingredient (A) is dissolved.

2. An oil-modified alkyd resin composition as claimed in claim 1 in which the composition further comprises from 0.5 to 5 parts by weight of an organic peroxide and from 0.01 to 5 parts by weight of a reducing agent with respect to 100 parts by weight of the ingredients (A) and (B).

3. An oil-modified alkyd resin composition as claimed in claim 1 in which from 2 to 100 mole percent of a polybasic acid constituent of the oil-modified alkyd resin is 3-(β-methyl-2-butenyl)-5-methyl-1,2,3,6-tetrahydrophthalic anhydride.

4. An oil-modified alkyd resin composition as claimed in claim 1 in which the ingredient (B) is a mixture of 2-hydroxypropyl acrylate and 1,4-butanediol diacrylate.

5. An oil-modified alkyd resin composition as claimed in claim 1 in which an oil or fatty acid which is a constituent of the oil-modified alkyd resin contains more than 60 percent by weight of linoleic acid or linolenic acid or a mixture thereof.

6. An oil-modified alkyd resin composition as claimed in claim 1 in which the concentration of sorbic acid in the oil-modified alkyd resin is from 0.5 to 30 parts by weight.

7. An oil-modified alkyd resin composition as claimed in claim 1 in which said ingredient B is an acrylate or methacrylate having a boiling point above 200° C.

8. An oil-modified alkyd resin composition as claimed in claim 1 in which said ingredient B is
a monoacrylate or monomethacrylate ester wherein the ester group thereof is selected from group consisting of 2-hydroxyethyl, 2-hydroxylpropyl, 2-hydroxyethoxyethyl, 4-hydroxybutyl, 5-hydroxypentyl, 6-hydroxyhexyl, neopentylglycol, 3-butoxy-2-hydroxypropyl, 2-hydroxyl-1-, -2-phenylethyl, polypropylene glycol, glycerine, di-ethyleneglycol, cyclohexyl, benzyl, 2-ethoxyethyl, 2-butoxyethyl, and tetrahydrofuryl, or a
di-, tri-, or tetraacrylate ester of a polyol selected from the group consisting of 1,4-butanediol, 1,6-hexanediol, neopentylglycol, trimethylol-propane, pentaerythritol, pentaerythritol, and glycerine and a combination thereof.

9. An oil-modified alkyd resin composition as claimed in claim 1 in which said ingredient B is selected from the group consisting of tetrahydrofurfuryl acrylate, 2-hydroxylethyl methacrylate, 2-hydroxypropyl acrylate, 3-butoxy-2-hydroxypropyl acrylate, 1,4-butanediol diacrylate, 1,6-hexanediol diacrylate, trimethylolpropane triacrylate and trimethyacrylate.

* * * * *